(12) United States Patent
Heilig

(10) Patent No.: US 6,547,276 B2
(45) Date of Patent: Apr. 15, 2003

(54) VEHICLE OCCUPANT RESTRAINT SYSTEM

(75) Inventor: Alexander Heilig, Wissgoldingen (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/754,778

(22) Filed: Jan. 4, 2001

(65) Prior Publication Data

US 2001/0006289 A1 Jul. 5, 2001

(30) Foreign Application Priority Data

Jan. 5, 2000 (DE) ................................ 200 00 144 U

(51) Int. Cl.⁷ ............................................... B60R 21/28
(52) U.S. Cl. ..................... 280/739; 280/728.2; 280/736
(58) Field of Search ............................. 280/739, 736, 280/741, 742, 728.2; B60R 21/28

(56) References Cited

U.S. PATENT DOCUMENTS

| | | | |
|---|---|---|---|
| 3,532,360 A | | 10/1970 | Leising et al. |
| 5,234,229 A | | 8/1993 | Gordon |
| 5,366,242 A | * | 11/1994 | Faigle et al. ............... 280/739 |
| 5,695,214 A | * | 12/1997 | Faigle et al. ............... 280/739 |
| 6,056,318 A | | 5/2000 | Braunschadel |
| 6,139,048 A | | 10/2000 | Braunschadel |

FOREIGN PATENT DOCUMENTS

| | | |
|---|---|---|
| DE | 3147780 | 9/1982 |
| DE | 19624044 | 12/1997 |
| DE | 19628836 | 1/1998 |
| DE | 19633883 A1 | 2/1998 |
| DE | 19809573 | 9/1999 |
| DE | 19810537 | 9/1999 |
| DE | 19821838 | 11/1999 |
| DE | 29907607 | 11/1999 |
| DE | 19912369 A1 | 10/2000 |
| EP | 0917994 A1 | 5/1999 |
| EP | 0917995 A1 | 5/1999 |
| EP | 1112902 A2 | 7/2001 |
| JP | 03032957 | 2/1991 |
| JP | 08225055 | 9/1996 |
| WO | WO0134436 A1 | 5/2001 |

* cited by examiner

*Primary Examiner*—Eric Culbreth
(74) *Attorney, Agent, or Firm*—Tarolli, Sundheim, Covell & Tummino L.L.P.

(57) ABSTRACT

A vehicle occupant restraint system comprises a compressed gas source, a gas bag inflatable with compressed gas furnished by the compressed gas source which generates a gas flow, and a valve through which the gas is able to escape from the restraint system. Thee valve is arranged such that it is impacted by the gas flow and the valve reduces its flow cross-section upon an increase in pressure of the gas flow.

5 Claims, 1 Drawing Sheet

VEHICLE OCCUPANT RESTRAINT SYSTEM

FIELD OF THE INVENTION

The invention relates to vehicle occupant restraint systems.

BACKGROUND OF THE INVENTION

In restraint systems the gas bag is initially fully inflated with minimum delay. In order to enable the gas bag to absorb as much kinetic energy as possible, a valve is provided through which the gas can escape in a controlled manner. For this purpose the valve needs to have a negative coefficient characteristic, i.e. the heavier the vehicle occupant the smaller the exit flow of gas per unit of time is to be, so that the heavy vehicle occupant can be restrained with a greater force, whilst in the case of a lightweight vehicle occupant needing to be cushioned with less force the gas bag is required to become "soft" more quickly. Various types of restraint systems incorporating such a valve are known, the gas bag mostly being provided with a through-flow opening which becomes smaller as a function of the internal pressure. Thus EP 0 917 994 teaches a gas bag having a through-flow opening surrounded by a loop. On an increase in the internal pressure the gas bag expands, the loop is tightened and reduces the flow cross-section of the through-flow opening. Another variant is disclosed by DE 196 33 883 A1. In this case the through-flow opening is covered by a fabric part of reduced expandability so that when the gas bag fabric is highly tensioned the through-flow opening is closed. However, the static pressure needs to attain a minimum value before these valves will close, so in the initial phase of inflation a gas flow can exit which will then be no longer available for filling the gas bag, thus prolonging the inflation time. A somewhat different solution reads from EP 0 917 995 in which the through-flow opening in the gas bag is covered by a fabric part which billows when the gas is passing by, puckering its edge thus reducing the flow cross-section of the through-flow opening. Here too, a prior gas flow is needed which will then be lost for inflation.

The invention has the object of improving a vehicle occupant restraint system of the aforementioned kind such that the gas flow made available by the inflator is optimally utilizable for inflating the gas bag.

BRIEF SUMMARY OF THE INVENTION

The invention provides a vehicle occupant restraint system comprising a compressed gas source, a gas bag inflatable with compressed gas furnished by the compressed gas source, and a valve through which the gas is able to escape from the restraint system, the gas source generating a gas flow, the valve being arranged such that it is impacted by said gas flow and the valve reducing its flow cross-section upon an increase in pressure of the gas flow. Since the compressed gas source furnishes the maximum flow pressure on ignition, the valve has, shortly after activation, its minimum flow cross-section because it is impacted by the gas flow, so that at least on commencement of the inflation action hardly any gas is lost. This thus ensures quickest possible inflation of the gas bag.

In one embodiment of the invention the characteristic of the valve is adjustable thus enabling, simply by setting the valve, compressed gas sources of the same type to be put to use for differing gas bags. In addition, it can be set how strongly the gas bag is to be inflated, for instance as a function of the position or weight of the vehicle occupant when a corresponding sensing device is provided.

In accordance with the preferred embodiment of the invention the compressed gas source is an inflator and the valve is integrated in the inflator. This, for one thing, simplifies fabricating the gas bag, since it now no longer needs to be provided with relief openings, and, for another, this minimizes the flow path between the inflator and the valve so that the valve is able to react as quickly as possible.

Advantageous aspects of the invention read from the sub-claims.

BRIEF DESCRIPTION OF THE DRAWINGS

Further aspects and advantages of the invention read from the following description with reference to the sole drawing illustrating a cross-section through a vehicle occupant restraint system in accordance with the invention.

DETAILED DESCRIPTION OF A PREFERRED EMBODIMENT

Figure 1:
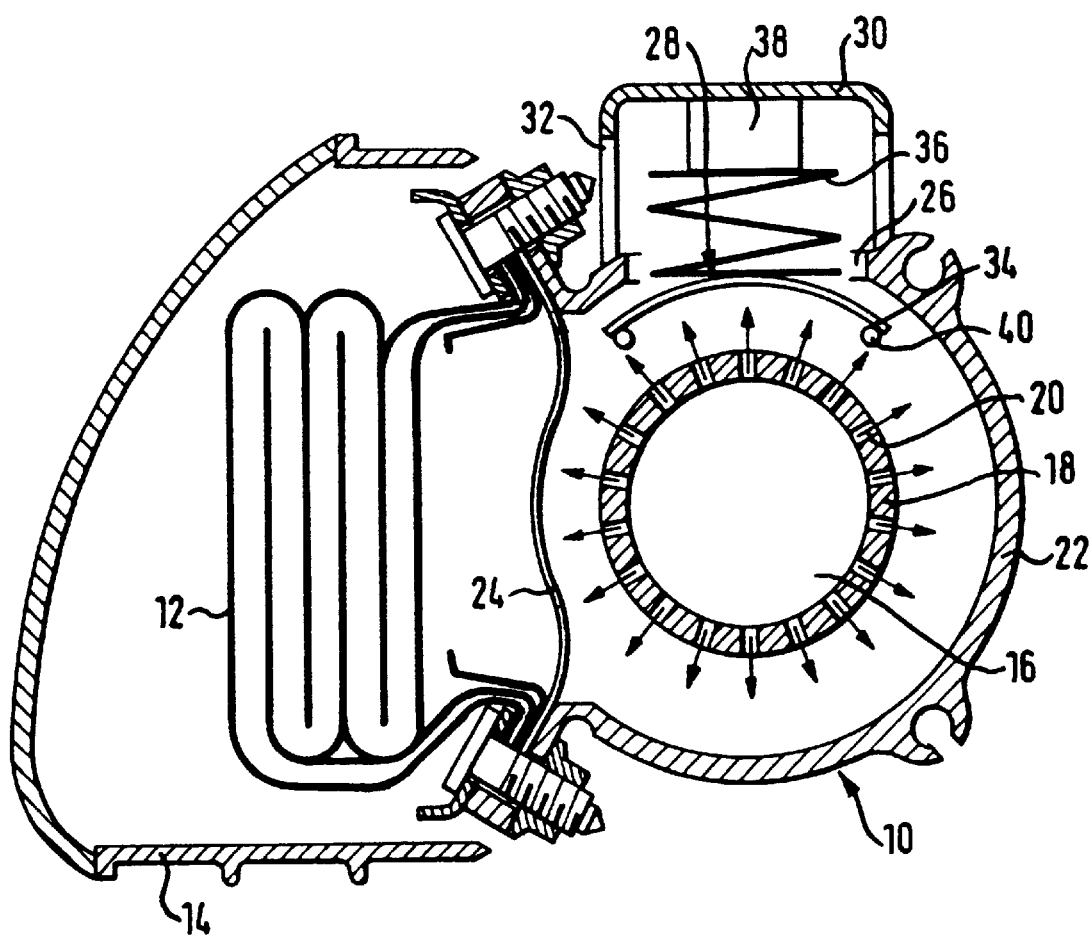

Referring now to FIG. 1 there is illustrated in cross-section a vehicle occupant restraint system in accordance with the invention comprising an inflator 10, a gas bag 12 and a gas bag cover 14. The inflator 10 has a combustion chamber 16 which is closed off by a combustion chamber wall 18. Incorporated in the combustion chamber wall 18 is a radial arrangement of gas exit openings 20. The inflator 10 comprises further a housing 22 which is open in the direction of the gas bag 12. A filter 24 protects the gas bag from hot combustion debris. Provided in the housing 22 is a opening 26 which can be closed off by a valve 28. Applied to the opening 26 on the outer side of the housing 22 is a cover cap 30 having lateral openings 32. The valve 28 consists of a plate 34 and a spring 36. The spring 36 is supported via a positioner 38 on the cover cap 30. The plate 34 is loaded by the spring 36 against two stops 40 in the inflator housing 22.

On ignition of the inflator a gas materializes in the combustion chamber 16 which exits through the gas exit openings 20 at high velocity. Part of the gas flow impinges the plate 34 which due to the flow pressure is moved in the direction of the rim of the housing 22 in overcoming the force of the spring 36, to close off the opening 26. This results in the gas flowing into the gas bag 12 which is then deployed in the usual manner. Once generating the gas is completed, i.e. once the gas generant in the combustion chamber has been used up, the gas flow becomes weaker and the spring 36 opens the valve so that the opening 26 is re-opened thus enabling the gas to escape through the opening 26 and the openings 32 in the cover cap 30. This results in the gas bag 12 becoming pliant and the kinetic energy of the vehicle occupant is depleted by acceleration of the gas held in the gas bag 12.

By means of the positioner 38 the preload of the spring 36 can be varied. Increasing the preload of the spring 36 results in the valve 28 being reopened already at a higher flow pressure, i.e. earlier during the inflation action so that the gas bag 12 is not filled so strongly, as is required when a lighter vehicle occupant needs to be cushioned.

During the restraint action, i.e. when the valve 28 is reopened and the weight of the vehicle occupant urges the gas from the gas bag 12 a gas flow exists through the opening 26 whereby the effective flow cross-section of the valve 28 adjusts itself to the gas flow through the opening 26 and the spring force of the spring 36. This results in, as desired, that the gas bag 12 becomes "soft" more quickly in the case of a lightweight vehicle occupant than in the case of a heavy vehicle occupant. The valve 28 then operates—like the known adjustable gas exit openings—as a valve having a negative coefficient characteristic.

Since the operation and more particularly the volume of the gas generated by the inflator 10 depends on the ambient temperature in the vehicle, a temperature-dependent characteristic can be induced in the valve 28 to ensure a consistent restraint function of the system. This is achievable, for example, by selecting a temperature-dependent spring material for the spring 36. As an alternative it is likewise conceivable to set the preload of the spring 36 by the positioner 38 as a function of the ambient temperature sensed by means of an external sensor as usually exists in the vehicle in any case.

It will readily be appreciated that the invention is not restricted to the embodiment as shown, i.e. the flow-dependent valve could be incorporated just as well in some other position where it is impacted by the gas flow. For example, for space reasons, the gas bag and inflator could be separated and connected by a conduit.

By relatively simple means a specific characteristic of the valve may also be achieved by altering the spring mass system by taking into account the mass inertia, for example, of the plate.

What is claimed is:

1. A vehicle occupant restraint system comprising a compressed gas source, a gas bag inflatable with compressed gas furnished by said compressed gas source, and comprising a valve with a flow cross-section through which said gas is able to escape from said restraint system through an opening, said gas source generating a gas flow, said valve being biased into a position in which said opening is open and being arranged such that it is impacted by said gas flow and said valve reducing said flow cross-section upon an increase in pressure of said gas flow both from said gas generator and from said gas bag towards said opening.

2. The vehicle occupant restraint system of claim 1, said valve having an adjustable characteristic, said adjustable characteristic comprising one of a variable increase and decrease in flow cross-section through which said gas escapes in response to one of an increase or decrease in gas flow pressure from said gas bag during inflation of said gas bag and also during impact of a vehicle occupant into said gas bag.

3. The vehicle occupant restraint system of claim 1, wherein said compressed gas source is an inflator and said valve is integrated in said inflator.

4. The vehicle occupant restraint system of claim 1, said valve comprising a plate movable by said gas flow pressure from an open position in which it opens said gas flow cross-section, into a closed position in which said plate closes off said flow cross-section.

5. The vehicle occupant restraint system of claim 4, wherein said plate is biased into said open position by at least one spring.

* * * * *